US009841338B2

United States Patent
Hedtke et al.

(10) Patent No.: US 9,841,338 B2
(45) Date of Patent: *Dec. 12, 2017

(54) HIGH INTEGRITY PROCESS FLUID PRESSURE PROBE

(71) Applicant: Rosemount Inc., Shakopee, MN (US)

(72) Inventors: Robert C. Hedtke, Young America, MN (US); Fred C. Sittler, Excelsior, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,066

(22) Filed: Aug. 30, 2016

(65) Prior Publication Data

US 2016/0370240 A1    Dec. 22, 2016

Related U.S. Application Data

(62) Division of application No. 13/930,583, filed on Jun. 28, 2013, now Pat. No. 9,442,031.

(51) Int. Cl.
*G01L 7/08*   (2006.01)
*G01L 9/12*   (2006.01)
(Continued)

(52) U.S. Cl.
CPC .......... *G01L 9/0042* (2013.01); *G01L 9/0072* (2013.01); *G01L 19/0023* (2013.01);
(Continued)

(58) Field of Classification Search
None
See application file for complete search history.

(56) References Cited

U.S. PATENT DOCUMENTS 3,480,036 A    11/1969  Ehrens et al.
4,161,887 A    7/1979   Stone
(Continued)

FOREIGN PATENT DOCUMENTS

CN    1131462 C     9/1996
CN    1447096 A    10/2003
(Continued)

OTHER PUBLICATIONS

Communication from European Patent Application No. 14734346.1, dated Feb. 4, 2016.
(Continued)

*Primary Examiner* — Peter Macchiarolo
*Assistant Examiner* — Jermaine Jenkins
(74) *Attorney, Agent, or Firm* — Westman, Champlin & Koehler, P.A.

(57) ABSTRACT

A process fluid pressure measurement probe includes a pressure sensor formed of a single-crystal material and mounted to a first metallic process fluid barrier and disposed for direct contact with a process fluid. The pressure sensor has an electrical characteristic that varies with process fluid pressure. A feedthrough is formed of a single-crystal material and has a plurality of conductors extending from a first end to a second end. The feedthrough is mounted to a second metallic process fluid barrier and is spaced from, but electrically coupled to, the pressure sensor. The pressure sensor and the feedthrough are mounted such that the secondary metallic process fluid barrier is isolated from process fluid by the first metallic process fluid barrier.

8 Claims, 4 Drawing Sheets

(51) Int. Cl.
  *G01L 9/00* (2006.01)
  *G01L 19/00* (2006.01)
  *G01L 19/06* (2006.01)

(52) U.S. Cl.
  CPC ...... *G01L 19/0046* (2013.01); *G01L 19/0084* (2013.01); *G01L 19/0645* (2013.01); *G01L 19/0672* (2013.01)

(56) References Cited

U.S. PATENT DOCUMENTS

| | | | |
|---|---|---|---|
| 4,163,395 A | 8/1979 | Medlar | |
| 4,679,567 A | 7/1987 | Hanlon et al. | |
| 4,788,871 A | 12/1988 | Nelson | |
| 4,852,466 A | 8/1989 | Freeman | |
| 4,942,383 A | 7/1990 | Lam et al. | |
| 4,970,898 A | 11/1990 | Walish | |
| 5,000,047 A | 3/1991 | Kato et al. | |
| 5,022,270 A | 6/1991 | Rud, Jr. | |
| 5,212,989 A | 5/1993 | Kodama et al. | |
| 5,396,802 A | 3/1995 | Moss | |
| 5,463,904 A | 11/1995 | Kalinoski | |
| 5,524,492 A | 6/1996 | Frick et al. | |
| 5,637,802 A | 6/1997 | Frick et al. | |
| 5,665,899 A | 9/1997 | Willcox | |
| 5,668,322 A | 9/1997 | Broden | |
| 5,670,722 A | 9/1997 | Moser | |
| 5,680,109 A | 10/1997 | Lowe et al. | |
| 5,709,337 A | 1/1998 | Moser | |
| 5,731,522 A | 3/1998 | Sittler | |
| 6,038,961 A | 3/2000 | Filippi et al. | |
| 6,050,145 A | 4/2000 | Olson | |
| 6,079,276 A | 6/2000 | Frick et al. | |
| 6,082,199 A | 7/2000 | Frick et al. | |
| 6,089,097 A | 7/2000 | Frick et al. | |
| 6,151,557 A | 11/2000 | Broden et al. | |
| 6,253,624 B1 | 7/2001 | Broden et al. | |
| 6,354,152 B1 | 3/2002 | Herlik | |
| 6,425,290 B2 | 7/2002 | Willcox et al. | |
| 6,457,367 B1 | 10/2002 | Behm et al. | |
| 6,473,711 B1 | 10/2002 | Sittler et al. | |
| 6,480,131 B1 | 11/2002 | Roper et al. | |
| 6,484,585 B1 | 11/2002 | Sittler et al. | |
| 6,505,516 B1 | 1/2003 | Frick et al. | |
| 6,508,129 B1 | 1/2003 | Sittler | |
| 6,516,671 B2 | 2/2003 | Romo et al. | |
| 6,520,020 B1 | 2/2003 | Lutz et al. | |
| 6,561,038 B2 | 5/2003 | Gravel et al. | |
| 6,568,274 B1 | 5/2003 | Lucas | |
| 6,662,662 B1 | 12/2003 | Nord | |
| 6,722,927 B1 | 4/2004 | Eriksen | |
| 6,843,139 B2 | 1/2005 | Schumacher et al. | |
| 6,848,316 B2 | 2/2005 | Sittler et al. | |
| 6,883,380 B2 | 4/2005 | Romo | |
| 6,901,803 B2 | 6/2005 | Fandrey | |
| 6,966,229 B2 | 11/2005 | Seeberg | |
| 7,000,478 B1 | 2/2006 | Zwollo et al. | |
| 7,036,381 B2 | 5/2006 | Broden et al. | |
| 7,036,385 B2 | 5/2006 | Murai | |
| 7,190,053 B2 * | 3/2007 | Orth | H05K 1/0218 257/659 |
| 7,290,452 B2 | 11/2007 | Hedtke | |
| 7,409,867 B2 | 8/2008 | Toy et al. | |
| 7,458,275 B2 | 12/2008 | Kleven | |
| 7,624,642 B2 | 12/2009 | Romo | |
| 7,819,014 B1 | 10/2010 | Broden | |
| 7,937,989 B2 | 5/2011 | Marchesi | |
| 7,962,294 B2 | 6/2011 | Dozoretz et al. | |
| 8,024,982 B2 | 9/2011 | Seeberg | |
| 8,122,771 B2 | 2/2012 | Seeberg et al. | |
| 8,448,519 B2 * | 5/2013 | Broden | G01L 13/026 73/700 |
| 8,578,783 B2 | 11/2013 | Hedtke et al. | |
| 8,984,948 B2 | 3/2015 | Becher | |
| 9,010,191 B2 | 4/2015 | Strei et al. | |
| 9,038,476 B2 * | 5/2015 | Strei | G01L 19/0645 73/700 |
| 9,234,776 B2 | 1/2016 | Strei | |
| 9,442,031 B2 | 9/2016 | Hedtke et al. | |
| 9,459,170 B2 | 10/2016 | Haywood | |
| 2002/0003917 A1 | 1/2002 | Sherrer | |
| 2002/0023499 A1 | 2/2002 | Boehler et al. | |
| 2002/0100333 A1 | 8/2002 | Gravel et al. | |
| 2003/0117837 A1 | 6/2003 | Park et al. | |
| 2003/0177837 A1 | 9/2003 | Broden et al. | |
| 2005/0193825 A1 | 9/2005 | Otsuka | |
| 2005/0248434 A1 | 11/2005 | Kurtz et al. | |
| 2006/0123933 A1 | 6/2006 | Braaten | |
| 2006/0162458 A1 | 7/2006 | Broden | |
| 2006/0236775 A1 | 10/2006 | Mei | |
| 2008/0006094 A1 | 1/2008 | Schulte et al. | |
| 2008/0053242 A1 | 3/2008 | Schumacher | |
| 2008/0083283 A1 | 4/2008 | Takeuchi | |
| 2008/0110269 A1 | 5/2008 | Strietzel et al. | |
| 2008/0245158 A1 | 10/2008 | Hedtke | |
| 2009/0000393 A1 | 1/2009 | Nyfors et al. | |
| 2009/0064803 A1 | 3/2009 | Pettit | |
| 2009/0165424 A1 | 7/2009 | Lutz | |
| 2009/0249882 A1 | 10/2009 | Kraatz | |
| 2009/0293625 A1 | 12/2009 | Sundet et al. | |
| 2010/0064816 A1 | 3/2010 | Filippi et al. | |
| 2010/0198547 A1 | 8/2010 | Mulligan et al. | |
| 2010/0281994 A1 | 11/2010 | Brown | |
| 2011/0247425 A1 | 10/2011 | Moldenhauer | |
| 2012/0006119 A1 | 1/2012 | Broden | |
| 2012/0046870 A1 | 2/2012 | Lievois et al. | |
| 2012/0079884 A1 | 4/2012 | Broden et al. | |
| 2013/0047737 A1 | 2/2013 | Vagle et al. | |
| 2013/0068029 A1 | 3/2013 | Romo et al. | |
| 2013/0074604 A1 | 3/2013 | Hedtke et al. | |
| 2013/0160560 A1 | 6/2013 | Strei et al. | |
| 2013/0167961 A1 | 7/2013 | Becher | |
| 2013/0233058 A1 | 9/2013 | Breen | |
| 2014/0041437 A1 | 2/2014 | Hedtke | |
| 2014/0083171 A1 | 3/2014 | Strei | |
| 2014/0213103 A1 | 7/2014 | Ohmeyer et al. | |
| 2014/0260644 A1 | 9/2014 | Sahagen | |
| 2014/0298914 A1 | 10/2014 | Vagle | |
| 2015/0000417 A1 | 1/2015 | Hedtke et al. | |
| 2015/0260633 A1 | 9/2015 | Hedtke et al. | |

FOREIGN PATENT DOCUMENTS

| | | |
|---|---|---|
| CN | 1777790 A | 5/2006 |
| CN | 101802581 A | 8/2010 |
| CN | 102162762 A | 8/2011 |
| CN | 102356307 A | 2/2012 |
| CN | 103017969 A | 4/2013 |
| CN | 203069314 U | 7/2013 |
| DE | 10 2010 041 17 | 3/2011 |
| EP | 1 116 943 | 7/2001 |
| JP | 2002-022586 | 1/2002 |
| JP | 2011-123011 | 6/2011 |
| JP | 02141635 | 7/2013 |
| JP | 10096656 | 7/2013 |
| JP | 10160530 | 7/2013 |
| WO | WO9508759 A1 | 3/1995 |
| WO | WO0161219 A2 | 8/2001 |
| WO | WO2010141655 A2 | 12/2010 |
| WO | WO2011000423 A1 | 1/2011 |

OTHER PUBLICATIONS

Office Action from U.S. Appl. No. 14/038,223, dated Jan. 28, 2016.
Office Action from Japanese Patent Application No. 2014-561027, dated Jan. 19, 2016.
Office Action from Chinese Patent Application No. 201410012367.5, dated Jan. 20, 2016.
Product Data Sheet 00813-0100-4716, Rev. LA, Rosemount 3095 MultiVariable "The Proven Leader in Multivariable Mass Flow Measurement", dated Dec. 31, 2008.

(56) References Cited

OTHER PUBLICATIONS

Notification of Transmittal of the International Searching Report and the Written Opinion of the International Searching Authority from PCT/US2014/049019, dated Jan. 20, 2015.
International Search Report and Written Opinion of the International Searching Authority for International Application No. PCT/US2014/052660, dated Mar. 31, 2015.
Invitation to Pay Additional Fees for International Application No. PCT/US2013/029064, dated Apr. 16, 2014.
International Search Report and Written Opinion of the International Searching Authority for International Application No. PCT/US2013/029064, dated May 28, 2014.
Patent Examination Report No. 1 for Australian Patent Application No. 2013230135, dated Nov. 26, 2014, 3 pages.
Communication pursuant to Rules 161(1) and 162 EPC for European Patent Application No. 13710942.7-1610, dated Dec. 2, 2014, 2 pages.
Office Action from Australian Patent Application No. 2013230135, dated Apr. 2, 2015.
Office Action from U.S. Appl. No. 14/037,805, dated Jun. 15, 2015.
Office Action from Chinese Application Serial No. 201380007242.7, dated Apr. 28, 2015.
Office Action from Japanese Application Serial No. 2014-561027, dated Aug. 25, 2015.
"Corrosion Resistance of Hastelly Alloys", Haynes International, Inc., 1984, pp. 1-4 and 45.
Office Action from Chinese Application No. 201210506130.3, dated Jan. 14, 2015.
"Application of Hardgrove Alloy C-276 Material in Chemical Pressure Vessel", by Li, Petrochemical Design, col. 20, No. 1, pp. 36-38, Dec. 31, 2003.
Office Action from Australian Application No. 2012359068, dated Jul. 15, 2014.
Office Action from Chinese Application No. 2012105061303, dated Jun. 10, 2014.
Office Action from European Application No. 12809549.4, dated Jul. 29, 2014.
International Search Report and Written Opinion of the International Searching Authority dated Jun. 5, 2013 for International Application No. PCT/US2012/070545, dated Dec. 19, 2012.
General Specifications EJX110A Differential Pressure Transmitter, Jan. 1, 2009. Retrieved from Internet : http://web.archive.org/web/20090407093933/http://www.yokogawa.com/fld/pdf/ejx/GS01C25B01-01E.pdf.

Hibner, E.L. and L.E. Shoemaker: "The Advantages of Nickel Alloys for Seawater Service, a New Generation of High Strength, Corrosion-Resistant Superalloy Products for Military Springs, Fasteners and Hardware". Special Metals Corporation, Huntington, WV 25705.
Fuji Electric—Differential Presure Transmitters for the Oil and Gas Industry. www.offshore-technology.com/contractors/instrumentation/fuji-electric/fuji-electric1.html.
Office Action from U.S. Appl. No. 13/630,547, dated Aug. 22, 2014.
Invitation to Pay Additional Fees for International Application No. PCT/US2014/052660, dated Dec. 18, 2014.
International Search Report and Written Opinion of the International Searching Authority for International Application No. PCT/US2014/040632, dated Dec. 3, 2014.
Office Action from U.S. Appl. No. 13/930,583, dated Feb. 1, 2016.
Invitation to Pay Additional Fees along with Annex to Form PCT/ISA/206 Results of the Partial International Search from PCT/US2015/048821, dated Nov. 12, 2015.
Office Action from Canadian Patent Application No. 2,866,380, dated Nov. 4, 2015.
Office Action from Russian Patent Application No. 2014140187, dated Nov. 9, 2015.
Office Action from U.S. Appl. No. 14/785,175, dated Sep. 16, 2015.
Office Action from U.S. Appl. No. 14/038223, dated Sep. 29, 2015.
International Search Report and Written Opinion of the International Searching Authority from PCT/US2015/048821, dated Mar. 18, 2016.
Office Action from U.S. Appl. No. 14/501,934, dated Mar. 21, 2016.
Communication from European Patent Application No. 14761526.4, dated May 4, 2016.
Office Action from Chinese Patent Application No. 201410363633.9, dated Jun. 13, 2016.
Examination Report from Australian Patent Application No. 2014328604, dated Aug. 18, 2016.
Office Action from Chinese Patent Application No. 201410012367.5, dated Aug. 25, 2016.
Office Action from Japanese Patent Application No. 2016-523756, dated Jan. 18, 2017.
Search Report and Official Action from Russian Patent Application No. 2016102422, dated Jan. 23, 2017.
Office Action from Canadian Patent Application No. 2,916,108, dated Nov. 25, 2016.
Office Action from European Patent Application No. 14734346.1, dated May 18, 2017.

\* cited by examiner

HIGH INTEGRITY PROCESS FLUID PRESSURE PROBE

CROSS-REFERENCE TO RELATED APPLICATION

The present application is a Divisional of and claims priority of U.S. patent application Ser. No. 13/930,583, filed Jun. 28, 2013, the content of which is hereby incorporated by reference in its entirety.

BACKGROUND

Industrial process control systems are used to monitor and control industrial processes used to produce or transfer fluids or the like. In such systems, it is typically important to measure "process variables" such as temperatures, pressures, flow rates, and others. Process control transmitters measure such process variables and transmit information related to the measured process variable back to a central location such as a central control room.

One type of process variable transmitter is a pressure transmitter which measures process fluid pressure and provides an output related to the measured pressure. This output may be a pressure, a flow rate, a level of a process fluid, or other process variable that can be derived from the measured pressure. The pressure transmitter is configured to transmit information related to the measured pressure back to the central control room. Transmission is typically provided over a two-wire process control loop, however, other communication techniques are sometimes used.

Generally, the pressure is coupled to the process variable transmitter through some type of process coupling. In many instances, a pressure sensor of the transmitter is fluidically coupled to the process fluid either through an isolation fluid or by direct contact with the process fluid. The pressure of the process fluid causes a physical deformation to the pressure sensor which generates an associated electrical change in the pressure sensor such as capacitance or resistance.

A pressure barrier is a mechanical structure that contains process fluid pressure. As such, pressure bathers are key requirements for process fluid pressure measurement system. In order to provide a safe and robust system, some manufacturers provide redundant pressure barriers. Thus, if a primary barrier fails, the process fluid is still contained by the secondary barrier.

One particularly challenging environment for pressure measurement is applications which have very high working pressure. One such application is the subsea environment. In such applications, the static pressure to which the process equipment is exposed can be quite high. Moreover, the process fluid can corrode many known metals. For example, some subsea applications are now being considered that require a 20,000 psi maximum working pressure (MWP). By requiring a 20,000 psi MWP, manufacturing approval standards typically require the pressure barriers of pressure sensors in such environments to withstand 2.5 times the maximum working pressure. Thus, a pressure barrier in such an application would need to be able to withstand 50,000 psi. The design criteria for pressure barriers are important in that they ensure the integrity of the process. Specifically, if the pressure barrier or barriers fail, it is possible for the process fluid to enter the environment. This is highly undesirable because the process fluid may be flammable or even explosive, or may generally cause environmental contamination. Thus, for subsea applications, it is desirable to provide two pressure bathers between the process fluid and the seawater, or the process fluid and the electronic compartment of the process fluid pressure transmitter.

SUMMARY

A process fluid pressure measurement probe includes a pressure sensor formed of a single crystal material and mounted to a first metallic process fluid barrier and disposed for direct contact with a process fluid. The pressure sensor has an electrical characteristic that varies with process fluid pressure. A feedthrough is formed of a single crystal material and has a plurality of conductors extending from a first end to a second end. The feedthrough is mounted to a second metallic process fluid barrier and is spaced from, but electrically coupled to, the pressure sensor. The pressure sensor and the feedthrough mounted such that the secondary metallic process fluid barrier is isolated from process fluid by the first metallic process fluid barrier.

DETAILED DESCRIPTION OF ILLUSTRATIVE EMBODIMENTS

Figure 1:
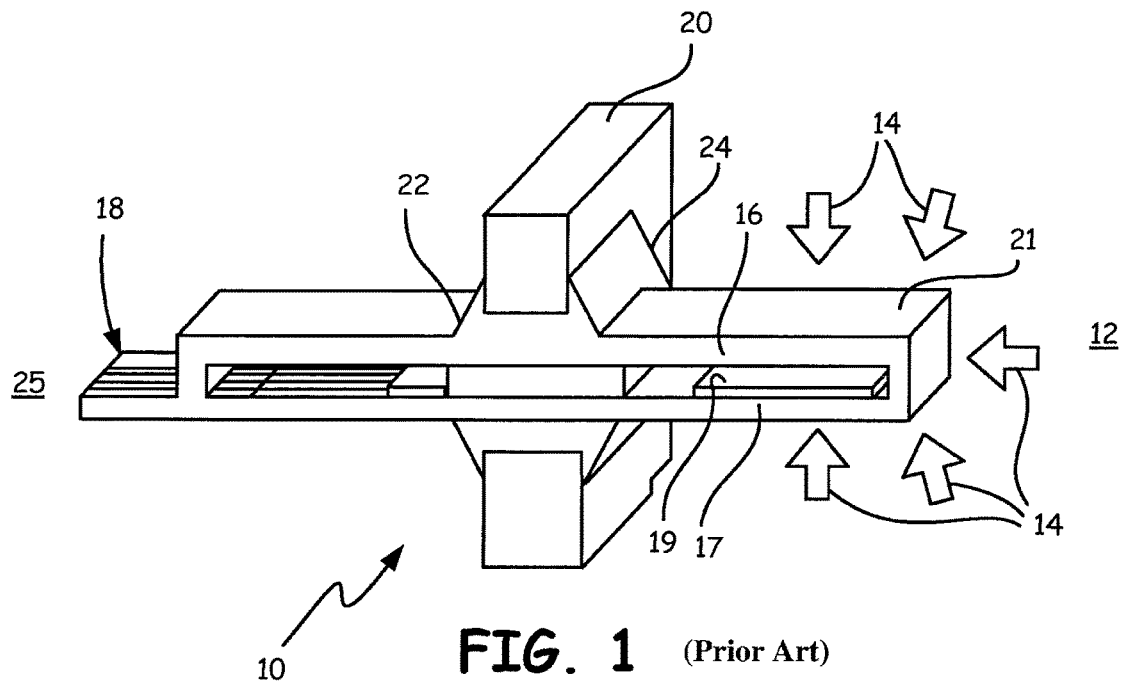
FIG. 1 is a diagrammatic perspective view of a single-crystal pressure sensor with which embodiments of the present invention are particularly useful.

Pressure barriers can take various forms. For example, a process isolation diaphragm generally works well as a primary pressure barrier. Additionally, remote seal capillary systems can be an effective secondary barrier. Glass or ceramic headers allow effective electrical connections while also providing a useful pressure barrier. Finally, pressure sensors themselves can be designed to contain pressure and thus serve as a pressure barrier.

As set forth above, pressure barriers are extremely important in process fluid pressure measurement because they ensure the integrity of the process fluid. However, pressure barriers create a number of challenges. Such challenges include costs, complexity, size, reliability, and compliance.

In order to effectively address the subsea environment, a number of design criteria must be considered. Reliability, safety, size and cost are all important design considerations.

Reliability is very important because the design lifetime of the process fluid measurement system may be on the order to 30 years. Moreover, failed units often cannot be easily replaced or repaired. Further, providing units that can be replaced can drive the cost of such designs very high and the replacement process itself can cost over a million dollars.

Safety is important because it is critical that the pressure and the process fluid be contained. Subsea process fluid pressure measurement systems typically require two pressure barriers between the process fluid and the seawater.

Size is another important design consideration. Generally, smaller components and systems are favored because it is easier to maintain the pressure. Further, with smaller designs there is more room for other instruments and devices. Further still, given the use of relatively exotic materials in order to combat corrosion in the subsea environment, smaller designs help reduce costs.

Thus, embodiments of the present invention generally provide an extremely high integrity, high pressure transmitter that may be lower cost, safer, and more reliable than previous devices. Embodiments of the present invention generally utilize a small, single-crystal pressure sensor that is suitable for direct contact with the process fluid itself. Such pressure sensors are known. For example, pressure sensors constructed of sapphire have been employed by Emerson Process Management, of Chanhassen, Minn. These sensors can withstand high pressure and high temperatures. Moreover, the sapphire pressure sensors can be disposed for direct contact with the process fluid. Sapphire pressure sensors generally enable a unique architecture that can be integrated into the process vessel (such as a pipe or flow element). The advantage of this architecture is that the process pressure is better contained within the vessel. While embodiments of the present invention will generally be described with respect to a pressure sensor formed of a single-crystal material, embodiments of the present invention can be practiced with any pressure sensor mounted to a substrate as set forth below.

FIG. 1 is a diagrammatic perspective view of a pressure sensor formed of a single-crystal material with which embodiments of the present invention are particularly useful. Pressure sensor 10, shown in FIG. 1, is known. For example, U.S. Pat. No. 6,520,020 discloses such a sensor. On the right side of FIG. 1 is the process pressure, illustrated diagrammatically at reference numeral 12. The process fluid pressure acts in the directions illustrated by arrows 14 to compress substrate 16, which in one embodiment is formed of sapphire. This compression of sapphire substrate 16 causes a change in the distance between the layers 16, 17 of the sapphire substrate. Conductors 19, 21 are deposited on the inside surfaces of the pressure sensor such that deflection of sapphire substrates 16, 17 causes a change in capacitance between conductors 19, 21. This change in capacitance is detected by suitable circuitry coupled to electrical terminations 18. Process barrier 20 is shown in the middle of FIG. 1. This may be a pipe or tank wall but is typically a structure that may be welded into a process pipe or tank, or any other structure that contains process fluid 12. Pressure sensor 10 passes through an aperture in process barrier 20 and is then brazed thereto as illustrated at reference numerals 22 and 24. To the left of FIG. 1 is nominally atmospheric pressure as indicated at reference numeral 25 where electrical terminations 18 are provided. Additionally, in some embodiments, pressure sensor 10 may include a temperature sensor, such as a resistance temperature detector, that provides an electrical indication, such as resistance, that varies with process fluid temperature.

In one commercially-available implementation of the pressure sensor 10, sold under the trade designation Model 4600 available from Emerson Process Management, a process diaphragm is a primary pressure barrier that separates process fluid from an oil-filled container. The oil within the oil-filled container contacts sapphire substrates 16, 17. In such case, the process diaphragm is the primary pressure barrier, and the brazed-feedthrough is the secondary pressure barrier. Both barriers can withstand extremely high pressures. Accordingly, it is believed that the sapphire-brazed barrier is an effective pressure barrier in part because it is proven, low cost, and small. However, in embodiments where an isolation or process diaphragm is not used or is simply too large or represents too much expense, allowing the process fluid pressure sensor 10 to directly contact the process media would cause the brazed feedthrough to become the primary pressure barrier. In high integrity process pressure measurement environments it is still necessary to have a secondary pressure barrier.

Figure 2:
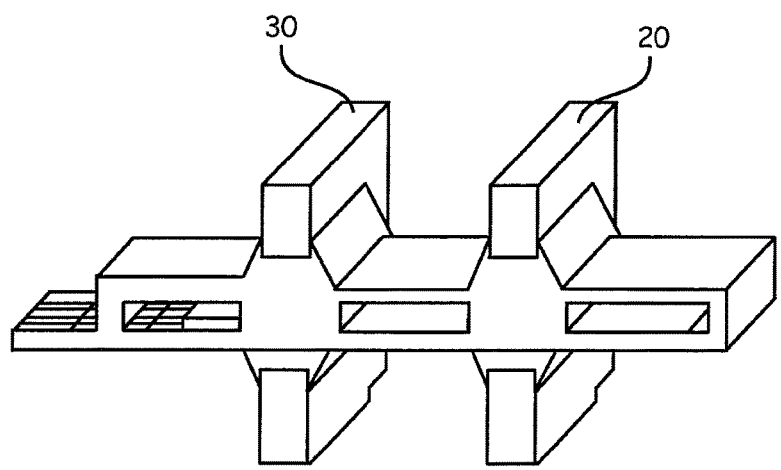
FIG. 2 is a diagrammatic view of a single-crystal pressure sensor being employed in an environment with a pair of pressure barriers.

FIG. 2 illustrates a single-crystal sapphire sensor being employed in a pressure measurement environment with a pair of pressure barriers. As illustrated in FIG. 2, a sensing portion of the pressure sensor is substantially the same as that illustrated in FIG. 1. Moreover, the brazed junction through process fluid container wall 20 is also similar. However, a secondary wall 30 is provided through which the pressure sensor also passes. A brazed connection with this barrier is also provided. While this arrangement represents a high integrity double pressure barrier system, it is not without various drawbacks. The first drawback is that axial stresses caused by temperature changes between the brazed metal barriers and the single-crystal material may likely cause catastrophic failure. The second drawback is that the barriers themselves can fail to hold pressure with a common mode sapphire failure sensor such as a leak between the top and bottom halves of the sensor.

Figure 3:
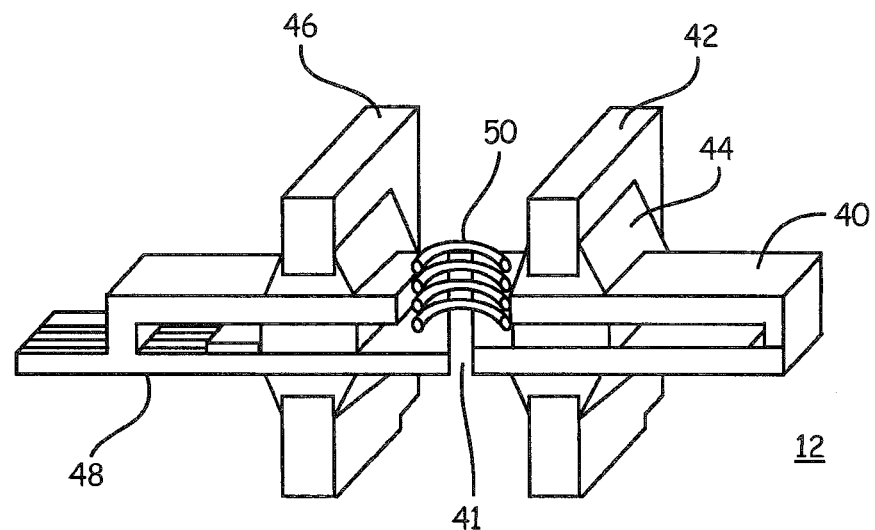
FIG. 3 is a diagrammatic view of a high pressure, high integrity process fluid pressure probe in accordance with an embodiment of the present invention.
Figure 4:
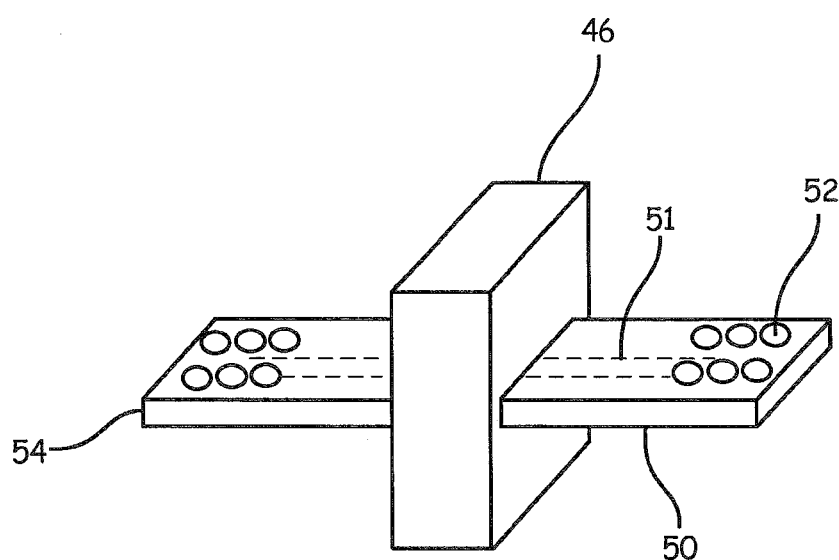
FIG. 4 is a diagrammatic view of a single crystal feedthrough acting as a secondary pressure barrier in accordance with an embodiment of the present invention.

FIG. 3 is a diagrammatic view of a high pressure, high integrity process fluid pressure probe in accordance with an embodiment of the present invention. As shown in FIG. 3, the problems of the double pressure barrier embodiments set forth above with respect to FIG. 2 are solved by imposing a gap 41 between the two pressure barriers. In this embodiment, process fluid 12 acts directly upon substrate 40 and the interior of process vessel 42. Sensor 40 passes through an aperture process fluid vessel 42, and is brazed thereto at connection 44. A second process containment structure is illustrated diagrammatically at reference numeral 46 and a single-crystal material feedthrough 48 is provided that extends through an aperture in 46. Feedthrough 48 is brazed to wall 46 in much the same manner that sensor 40 is brazed to the wall of process vessel 42. Electrical interconnections 50 are provided between structure 48 and sensor 40. In this manner, second pressure barrier 48 can be built on a simple, smaller structure with the appropriate number of connections. One suitable arrangement for structure 48 is illustrated with respect to FIG. 4. Feedthrough 50 includes a single-crystal substrate that passes through an aperture in secondary pressure barrier 46. Substrate 50 includes a plurality of conductive pads 52 that are configured to be coupled, via welding or any other suitable manner, to conductors 50 (shown in FIG. 3). Traces, or other suitable structures 51 on substrate 50 connect pads 52 to respective pads 54, which are configured to be coupled to a plurality of conductors that are ultimately coupled to a process pressure transmitter (shown in FIG. 5). Substrate 50 is sealed to barrier 46 at the aperture through barrier 46 by any suitable manner, such as brazing.

Referring back to FIG. 3, however, second structure 48, unlike feedthrough 50, can also include a sensor to detect a failure of the first barrier. Suitable sensors for structure 48 includes a pressure sensor or surface resistance sensor. Accordingly, if process fluid should pass through sensor 40 or breach the brazed junction 44, the pressure between walls 42 and 46 would increase. The secondary sensor would accordingly respond to such pressure and/or the presence of process fluid.

Figure 5:
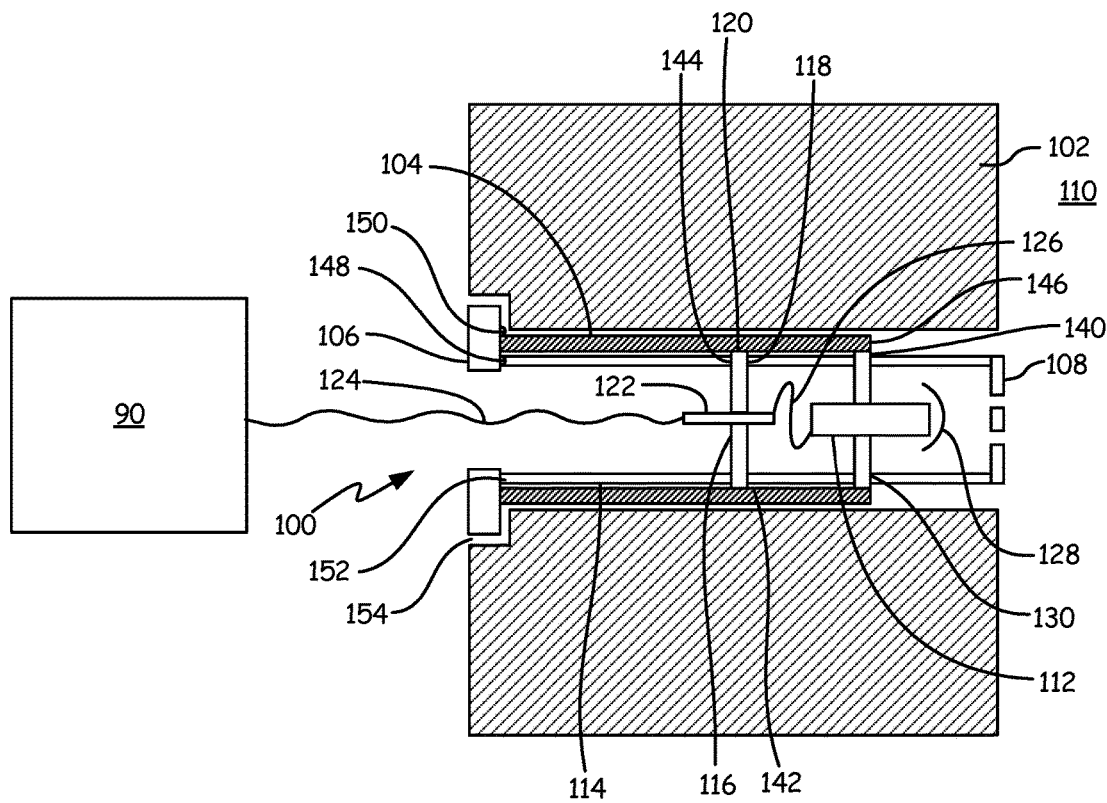
FIG. 5 is a diagrammatic cross-sectional view of a high pressure, high integrity single-crystal process fluid pressure probe coupled to a pressure transmitter in accordance with an embodiment of the present invention.

FIG. 5 is a diagrammatic cross-sectional view of a high pressure, high integrity single-crystal pressure sensor probe in accordance with an embodiment of the present invention. Probe 100 is coupled to transmitter 90 and is mounted to and extends through process barrier 102, which may be a pipe or tank wall. In the embodiment shown in FIG. 5, transmitter 90 is coupled to a single probe, however, transmitter 90 can be coupled to any suitable number of high pressure, high integrity probes in accordance with embodiments of the present invention. For example, using a pair of such probes allows transmitter 90 to provide an indication of differential pressure, or a redundant indication of absolute or gauge pressure. Using three such probes provides at least some redundancy as well as the ability to provide differential pressure. Transmitter 90 can be any suitable pressure transmitter, now known or later developed. Probe 100 is coupled to suitable electronics within transmitter 90. The electronics are configured to measure the changing electrical characteristic of the pressure sensor of probe 100 to determine process fluid pressure. Moreover, the electronics preferably include controller electronics to transmit, or otherwise convey, digital information indicative of the pressure over a process communication loop, such as a Highway Addressable Remote Transducer (HART®) loop or a FOUNDATION™ Fieldbus segment. In some embodiments, transmitter 90 may be loop-powered and thus may be wholly powered through the same conductors over which it communicates.

Probe 100 includes an outer tube 104 coupled to a weld ring 106 at a proximal end and to process interface screen 108 at a distal end. Process interface screen 108 is disposed for direct contact with process fluid 110, but protects single-crystal pressure sensor 112 from damage due to movement of particles and/or solids within the process fluid flow. An inner tube 114 is disposed within outer tube 104 and extends to secondary barrier 116. Secondary barrier 116 is formed by welding a metallic disc 118 to end 120 of inner tube 114. A single crystal interconnect 122, preferably formed of sapphire, passes through disc 120 and is brazed thereto. Interconnect 122 provides an electrical connection between conductors 124 and conductors 126 while passing through a high pressure, high integrity pressure barrier 116. Similarly, pressure sensor assembly 128 includes a disc 130 that is welded to a tubular member that itself is welded to disc 118. Further, disc 130 includes an aperture through which pressure sensor 112 passes. Pressure sensor 112 is brazed within the aperture to create another pressure barrier. Additionally, as illustrated in FIG. 5, there is no rigid interconnect between single-crystal interconnect 122 and sensor 112.

Figure 6:
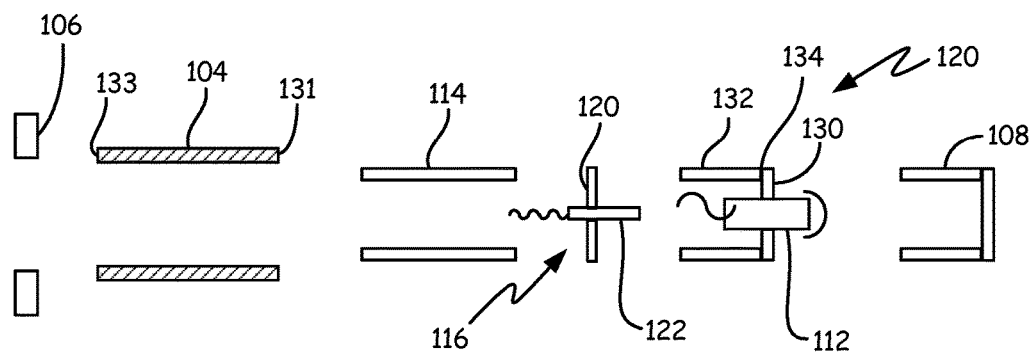
FIG. 6 is a diagrammatic exploded view of the high pressure, high integrity process fluid pressure fluid probe in accordance with an embodiment of the present invention.

FIG. 6 is a diagrammatic exploded view of the high pressure, high integrity process fluid pressure probe in accordance with an embodiment of the present invention. The process of assembling the probe includes assembling sensor assembly 128. Sensor assembly 128 is formed by from three distinct components. First, disc 130 is provided having an aperture therethrough. Next, pressure sensor 112 is passed through the aperture through disc 130, and pressure sensor 112 is brazed to disc 130. Next, sensor assembly tube 132 is welded to disc 130 at weld 129 to complete pressure sensor assembly 128. Sensor assembly tube 132, in one embodiment, has an outer diameter that is the same as that of inner tube 114. Process interface screen 108 is welded to sensor assembly 128 as indicated at reference numeral 140 (shown in FIG. 5). Next, secondary barrier 116 is formed by brazing single crystal interconnect 122 to metallic disc 120. Sensor assembly 128 is then welded to barrier assembly 116 at weld 142 (shown in FIG. 5). Next, barrier assembly 116 is welded, at reference numeral 144 (shown in FIG. 5), to the end of inner tube 114. Outer tube 104 is then attached to sensor assembly 128 via weld 146 (shown in FIG. 5) at its distal end 131. Next, the proximal end 133 of outer tube 104 is welded to weld ring 106 at weld 148 (shown in FIG. 5). Weld ring 106 is also welded to inner tube 114 at weld. The outer diameter of pipe 104 is then welded to weld ring 106 as indicated at weld 150 (shown in FIG. 5). Next the inner diameter of inner tube 114 is welded to weld ring 106 at weld 152 (shown in FIG. 5).

As indicated in FIG. 6, inner tube 114 is not contacted by process fluid and thus can be made with any suitable standard material, such as 316 stainless steel. Outer tube 104 is process-wetted and is thus made of a more expensive, exotic material such as Inconel or Alloy C276. Alloy C276 is an example of a material suitable for corrosive fluids. Alloy C276 is available from Haynes International Inc. of Kokomo, Ind. under the trade designation Hastelloy C276. Alloy C276 has the following chemical composition (by percent weight): Molybdenum 15.0-17.0; Chromium 14.5-16.5; Iron 4.0-7.0; Tungsten 3.0-4.5; Cobalt 2.5 maximum; Manganese 1.0 maximum; Vanadium 0.35 maximum; Carbon 0.01 maximum; Phosphorus 0.04 maximum; Sulfur 0.03 maximum; Silicon 0.08 maximum and Balance Nickel. Alloy C276 provides excellent corrosion resistance to corrosive applications, and very high strength. The outer tube 104 can be made with a smaller diameter and thinner material because sensor 112 is small and because inner tube 114 assists in supporting the pressure load. Moreover, machining is less expensive because these parts can be turned.

Once assembly of probe 100 is completed, probe 100 may be installed in a pipe or other suitable conduit. In order to do so, weld ring 106 is welded to the process fluid conduit at weld 154 (shown in FIG. 5). This results in a double pressure barrier, high integrity pressure probe for high pressure process measurement environments. The process interface is preferably a screen or similarly constructed assembly.

Embodiments of the present invention may include the utilization of an oil-filled system (such as that shown in FIG. 7), or a system in which the process fluid contacts the pressure sensor directly (such as that shown in FIG. 5). For an oil-filled system, the primary pressure barrier consists of the process diaphragm and welds 140, 146, and 150. The secondary pressure barrier consists of the sensor assembly braze and welds 142, 144, 148, 152, and 154. For an oil-less system, the sensor assembly braze joint becomes part of the primary pressure barrier and the single-crystal material barrier braze joint becomes part of the secondary pressure barrier. An important aspect of embodiments of the present invention is the utilization of the inner tube/outer tube combination. This enables significantly lower cost, small size, and redundant pressure barriers. These tubes are easily customized to length and enable installation into different sized vessels. Moreover, weld ring 106 enables the assembly to be directly welded into the vessel without the expense and space needed for a flange mounted unit. However, if the end user desires a flanged assembly, the weld ring can be replaced with a flange.

Figure 7:
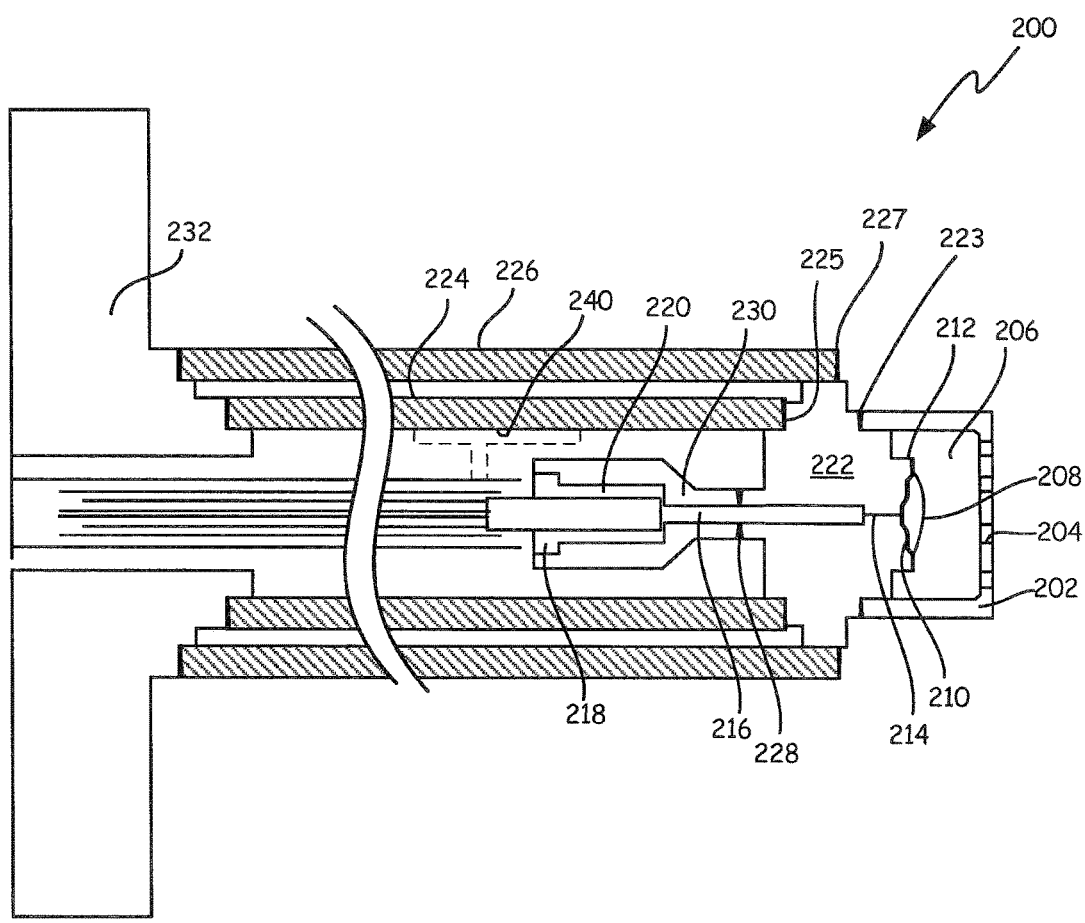
FIG. 7 is a cross sectional diagrammatic view of a high pressure, high integrity process fluid pressure probe in accordance with embodiments of the present invention.

FIG. 7 is a cross sectional diagrammatic view of a high integrity, high pressure probe in accordance with an embodiment of the present invention. Probe 200 includes process interface screen 202 having a plurality of apertures 204 therethrough. Within region 206, the process fluid contacts a foil isolator 208. The process fluid bears against isolator diaphragm 208 and pressurizes fill fluid 210 in region 212. Region 212 is fluidically coupled, via passageways 214, 216 to region 218 proximate single-crystal pressure sensor 220. In this way, process fluid pressure acting on isolator diaphragm 208 generates a corresponding pressure on sensor 220.

Isolator screen 202 is welded to isolator plug 222 at weld 223. Isolator plug 222 is welded to both inner and outer conduits (such as tubes) 224, 226 at welds 225, 227, respectively. Additionally, isolator plug 222 is also welded, at reference numeral 228, to tapered pressure sensor module 230. Tapered pressure sensor module 230 includes an aperture through which pressure sensor 220 is inserted. A disc to which pressure sensor 220 is brazed is then welded to tapered module 230 to create a sealed chamber within which pressure sensor 220 will sense the process fluid pressure. Electrical terminations on pressure sensor 220 can be made in any suitable manner, including utilization of a ceramic lead extender, or any other suitable electrical conductors. Each of inner conduit 224 and outer conduit 226 is also welded to flange 232 which can be attached, in any suitable manner, to the process.

In one embodiment, a suitable sensing structure, such as a strain gauge, indicated in phantom at reference numeral 240, is coupled to the inside surface of inner conduit 224. Thus, if weld 227 fails and process fluid enters the region between outer conduit 226 and inner conduit 224, the pressure of the process fluid will strain inner conduit 224. This strain will be detectable by strain gauge 240 and thus remedial action can be taken before the secondary pressure barrier fails as well.

Although the present invention has been described with reference to preferred embodiments, workers skilled in the art will recognize that changes may be made in form and detail without departing from the spirit and scope of the invention.

What is claimed is:

1. A process fluid pressure measurement probe comprising:
    a flange mountable to a process fluid conduit and having an aperture therethrough;
    an inner conduit having a pair of ends, a first end being welded to the flange;
    an outer conduit having a pair of ends, a first end being welded to the flange;
    an isolator plug welded to a second end of the inner conduit and to a second end of the outer conduit, the isolator plug having a passageway therethrough;
    an isolation diaphragm welded to the isolator plug, the isolation diaphragm being adapted for exposure to a process fluid;
    a pressure sensor module welded to the isolator plug, the pressure sensor module defining a chamber therein and having a conduit in fluidic communication with the passageway of the isolator plug;
    a pressure sensor mounted within the chamber, the pressure sensor having an electrical characteristic that varies with process fluid pressure;
    a fill fluid surrounding the pressure sensor within the chamber, the fill fluid coupling pressure from the isolation diaphragm to the pressure sensor;
    a plurality of leads coupled to the pressure sensor an extending therefrom through the aperture of the flange and being coupleable to a process pressure transmitter.

2. The process fluid pressure measurement probe of claim 1, and further comprising a process interface screen attached to the isolator plug and surrounding the isolation diaphragm.

3. The process fluid pressure measurement probe of claim 1, and further comprising a strain gauge mounted to an internal surface of the inner conduit.

4. The process fluid pressure measurement probe of claim 1, wherein the pressure sensor includes a temperature sensor therein.

5. The process fluid pressure measurement probe of claim 1, and further comprising a process fluid pressure transmitter coupled to the pressure sensor and configured to transmit an indication of process fluid pressure over a process control loop.

6. A process fluid pressure measurement probe comprising:
    a pressure sensor mounted to a first metallic process fluid barrier and having an electrical characteristic that varies with process fluid pressure;
    a feedthrough formed of a single crystal material and having a plurality of conductors extending from a first end to a second end, the feedthrough being mounted to a second metallic process fluid barrier and being spaced from, but electrically coupled to, the pressure sensor; and
    wherein the pressure sensor and the feedthrough are mounted such that the secondary metallic process fluid barrier is isolated from process fluid by the first metallic process fluid barrier.

7. The process fluid pressure measurement probe of claim 6, wherein the pressure sensor is formed of a single crystal material.

8. The process fluid pressure measurement probe of claim 6, wherein the pressure sensor is adapted for direct contact with a process fluid.

* * * * *